Sept. 16, 1958 W. SINDZINSKI 2,852,124
CONVEYOR SYSTEM PARTICULARLY AN
EDGE-WISE CONVEYOR SYSTEM
Filed Oct. 21, 1953 2 Sheets-Sheet 1
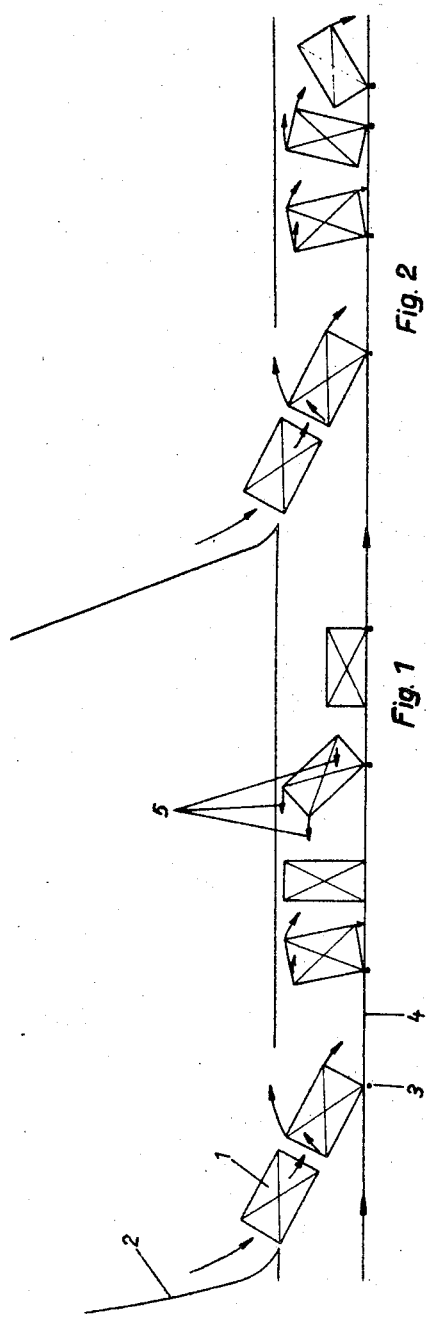
INVENTOR
W. SINDZINSKI
BY
ATTORNEY Sept. 16, 1958
W. SINDZINSKI
2,852,124
CONVEYOR SYSTEM PARTICULARLY AN
EDGE-WISE CONVEYOR SYSTEM
Filed Oct. 21, 1953
2 Sheets-Sheet 2
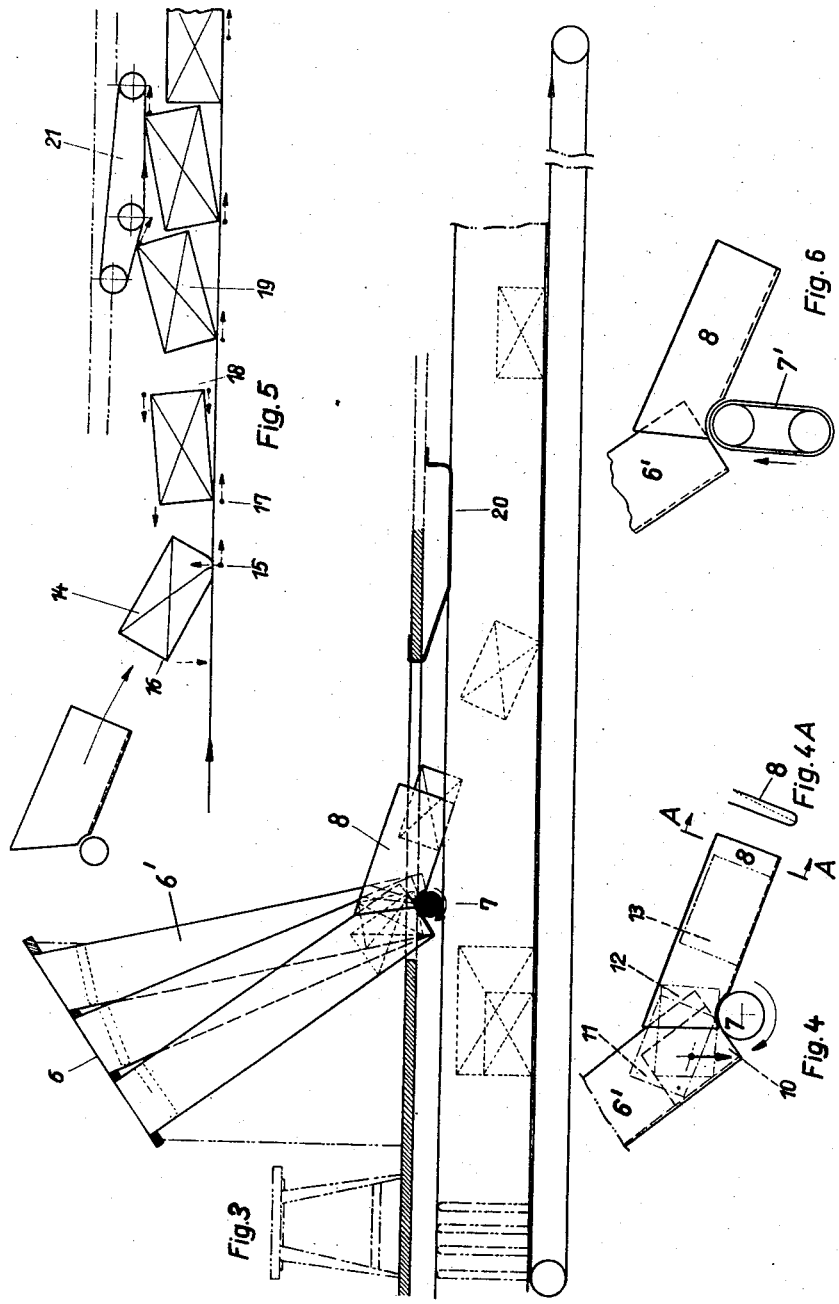
INVENTOR
W. SINDZINSKI
BY *Robert P. Hardley*
ATTORNEY

United States Patent Office 2,852,124
Patented Sept. 16, 1958

2,852,124

CONVEYOR SYSTEM PARTICULARLY AN EDGE-WISE CONVEYOR SYSTEM

Willy Sindzinski, Berlin, Germany, assignor to International Standard Electric Corporation, New York, N. Y., a corporation of Delaware Application October 21, 1953, Serial No. 387,384

Claims priority, application Germany October 22, 1952

8 Claims. (Cl. 198—25)

In conveyor systems, particularly edge-wise conveyor systems the sending goods are mostly introduced manually to the conveying channels. However, if there are arranged several conveying channels next to each other, as is the case e. g. in letter sorting machines, then the width of the conveyor system requires that the dispatch articles be conducted to the individual channels over slideways. Accordingly it is no longer possible to feed the dispatch articles manually to the conveying channel in such types of systems. Furthermore account has to be taken of the fact that these systems operate with substantially higher conveying speeds so that when inserting a dispatch article it will not be possible in all cases to maintain the intended position of the article to be dispatched.

However, it is a practical necessity to maintain the position of the dispatch articles in such systems in which the goods are piled up subsequently to the conveying process, and in which further processing is facilitated in that the dispatch articles maintain a position which permits an easy reading of the addresses etc. on them.

The slideways which are known for the use of feeding the dispatch articles to the respective channels, however, do not comply with these requirements regarding the reloading and further conveyance of the dispatch articles in a proper position. The main reason for this is the much too high departing speed with which the objects leave the feeder slideways.

The present invention relates to a conveyor system, particularly edge-wise conveyor system, in which the goods to be conveyed are fed to the different conveying channels via slideways. This invention, however, permits the dispatch articles to be reloaded into the conveying channels in a proper position and is achieved in that the slideways are subdivided into sections which are arranged at an angle to one another but in the same plane, and in that means are provided which serve to first of all stop the dispatch article coming out of the one section, and to transfer it directly thereafter or at predetermined later time, to the next section.

According to another feature of the invention the last mentioned means comprises a roller which projects into the slideway and which is driven in such a direction of rotation that the arriving dispatch article is lifted out of its stop-position and is transferred to the next section by engagement with the surface of the roller. However, a small conveyor belt may be used instead of a roller.

According to another feature of the invention one stop and transfer device is provided in common for several slideways leading to different conveying channels.

The slideways in cross-section have the shape of a U or horse-shoe. Some sections of the slideway may also be provided with conveyor belts on which the dispatch articles are conveyed standing edge-wise upright. Above the conveying channels there are arranged holding-down devices which are rigid or rotating in the conveying direction for guiding the sending goods coming out of the slideways.

By the application of such a device between the conveying sections the dispatch articles will be first of all stopped. At the same time the drive of the roller or conveyor belt respectively, may be interrupted continuously or momentarily. These interruptions of the drive may be desirable, for example, if the jamming of dispatch articles in the conveying channel is to be absolutely avoided. In this case the dispatch articles which are being conveyed underneath the slideway would have to cause the interruption of the drive of the roller by automatically actuating corresponding switching means, such as by the intermediary of a selenium cell.

The invention will be particularly described with reference to an example of an embodiment shown in Figs. 1–5 of the accompanying drawings, in which:

Figs. 1 and 2 show the different phases of the feeding process with regard to a conventional type of slideway;

Fig. 3 shows the slideway subdivided into several sections according to the present invention;

Fig. 4 shows the device provided between two sections of the slideway;

Fig. 4A is a cross-section taken on the line A—A of Fig. 4;

Fig. 5 shows the different phases of the feeding process in the conveying channel; and Fig. 6 shows a modification of Fig. 4.

Referring first to Fig. 1, this shows a letter in the different phases of the feeding process in a conventional type of feeding device. The letter 1 leaves the slideway 2 in the direction of the sliding angle last effective and meets at point 3 the conveyer belt 4. On account of the fact that the speed of the letter is considerably higher than that of the conveyer belt, the letter will pivot around the point 3 a which it contacts the belt, owing to its still effective kinetic energy. By this swing the letter will be placed edge-wise upright, whereby it will be possible that at the points 5 a torque will become effective on account of the feed force of the conveyor belt and the friction between the guide cheeks and the dispatch article, which will finally lead to the dispatch article being placed with its long supporting edge on the belt.

Fig. 2 shows a similar process. The dispatch article shown under the same conditions as in Fig. 1, however, has in this case a still greater kinetic energy which is sufficient to cause the dispatch article to swing completely over in an upside down position on the conveyor belt 4.

From a comparison between the two figures it will become apparent how differently the dispatch articles behave after leaving the slideways. Size, weight, and kind of surface of the dispatch article largely determine the performance of the feeding process. Moreover, when considering the fact that the slideways differ from each other with regard to their length or their incline, then it will become obvious that this equipment offers no guarantee for a consistent conveyance of articles on the belt in a proper position.

In comparison with the foregoing, Figs. 3 to 6 show an embodiment of a reloading point for edge-wise conveyor systems according to the invention.

From slideways 6' having different angles of inclination and different lengths, resulting e. g. from the arrangement of the letter openings 6, the dispatch articles will first meet a rotating roller 7, consisting preferably of an elastic material having a high coefficient of friction. From this arrangement it results that for all dispatch articles, irrespective of the conditions under which they arrive at this point, there is provided first a common dispatch point for transferring the dispatch articles into the different conveyor channels. For this purpose the slideways are subdivided into sections such as 6', 8 and the arrested dispatch article is transferred directly thereafter, or else at a predetermined later moment, from one section to the next section.

Fig. 4 shows the transition of the dispatch article from the slideway 6' into the shorter adjacent feed-in slideway section 8 which is arranged at a different angle but in the same plane as the slideway section 6'. By means of the rotating roller 7 the dispatch article 10 is brought first of all into the position 11 and is then introduced into the slideway section 8 after having gone through the phases 12, 13. The bottom of the slideway 8, in cross-section, is designed semi-circularly as shown in Fig. 4A for preventing torques from becoming effective upon the dispatch articles, which are otherwise likely, for instance, to be wedged in the corners. By keeping the slideway section 8 short, and by providing an incline towards the conveying channel there is obtained a particularly safe departure of the dispatch articles. Hence the entering speed of the dispatch articles may be largely adapted to that of the conveyor belt.

In place of the roller 7, a small conveyor belt 7' may be provided for performing the same functions as shown in Fig. 6.

If a plurality of slideways are arranged adjacent each other then one device such as the roller 7 or belt 7' may be employed in common for all slideways to serve for stopping the dispatch articles. In this case one drive only is required for all the slideways.

Directly in front of each of the feed-in points from the slideways there may be arranged above the conveying channels a special holding-down device, which is either rigid or capable of rotating in the conveying direction, and which serves to guide the dispatch articles coming out of the respective slideways. This holding-down device serves the purpose of pressing down onto the belt such dispatch articles which, on account of their special conformation are inclined to spring back after having touched the conveyor belt.

Fig. 5 shows for example, a dispatch article 14, the one corner of which is bent backwards and which on account thereof, is just about to spring-back. The following faces act upon this dispatch article: at point 15 a force acting upwards, originating from the spring-back effect of the bent corner and a feeding force in direction of the moving conveyor belt, whereas the corner 16 is moved downwards under the effect of the force of gravity. By this the dispatch article will be provided with such a turning movement that this particular corner finally reaches the belt at point 17 and that the dispatch article will thus be moved or pushed forwards. This dispatch article, however, has been lifted with its corner 18 away from the conveyor belt, so that now backward-directed braking forces act upon it at three points, which result in a lifting of the dispatch article at point 19.

In order to prevent such dispatch articles from being lifted so far that they perform a loop, according to a feature of the invention they are held down by means of a rigid holding-down device 20 shown in Fig. 3, or else by means of an endless rotating conveyor belt 21 shown in Fig. 5, until they assume a position in which their entire lower edge is brought in contact with the conveyor belt by the action of the force of gravity.

While I have described above the principles of my invention in connection with specific apparatus, and particular modifications thereof it is to be clearly understood that this description is made only by way of example and not as a limitation on the scope of my invention.

What is claimed is:

1. In a belt conveyor system means for introducing articles onto the conveyor belt, comprising a slideway formed of two sections mounted in the same plane and at a relatively steep obtuse angle to one another and a rotating device having a resilient, movable surface interposed at the adjoining open ends of said two sections, whereby an article introduced into said first section is first, caused to collide radially with said device, have its kinetic energy absorbed by said movable surface and then be transferred by said surface to the second section.

2. A belt conveyor system according to claim 1, in which said last-mentioned device comprises a rotatable roller a part of the surface of which is interposed between said two sections.

3. A belt conveyor system according to claim 1, in which said last-mentioned device comprises a supplementary belt a part of the surface of which is interposed between said two sections.

4. A belt conveyor system according to claim 1, in which a plurality of slideways arranged side by side are provided for introducing articles onto respective conveyor channels of the conveyor belt and in which said device having a movable surface is provided in common to said plurality of slideways.

5. An edge-wise belt conveyor system according to claim 1, in which said slideway sections have a U-shaped cross-section.

6. In a belt conveyor system a slideway for introducing articles onto the conveyor belt, comprising a first upper section inclined at a relatively steep angle to the surface of the conveyor belt, a second lower section in the same plane as said first section inclined at a more acute angle with respect to the surface of the conveyor belt the adjacent ends of said two sections being in communication for the passage of articles, and a device having a moving surface interposed at the junction of said two sections, said surface having such location and direction of movement that an article proceeding down the said first section is caused to collide radially against said moving surface is first arrested, it kinetic energy absorbed and then transferred by said moving surface to said second section.

7. A belt conveyor system according to claim 6, in which said two sections are inclined at an acute angle with respect to the conveyor belt towards its direction of movement and said moving surface is also driven in the same direction as said conveyor belt.

8. An edge-wise belt conveyor system according to claim 1 further comprising a holding-down device positioned above the conveyor belt ahead of said slideway, said holding-down device having a depending surface adapted to be engaged by the top of an article which has moved out of its normal position of travel.

References Cited in the file of this patent

UNITED STATES PATENTS

| | | |
|---|---|---|
| 1,219,067 | Bailey et al. | Mar. 13, 1917 |
| 1,442,441 | Pugh | Jan. 16, 1923 |
| 1,491,489 | Mueller | Apr. 22, 1924 |
| 1,770,222 | Van Houten | July 8, 1930 |
| 1,945,886 | Den Boer | Feb. 6, 1934 |
| 1,975,973 | Rairden | Oct. 9, 1934 |
| 2,069,872 | Burns | Feb. 9, 1937 |